Oct. 6, 1925.
J. B. LOGEMANN
1,556,529
TRACTOR TOP
Filed April 22, 1925    2 Sheets-Sheet 1
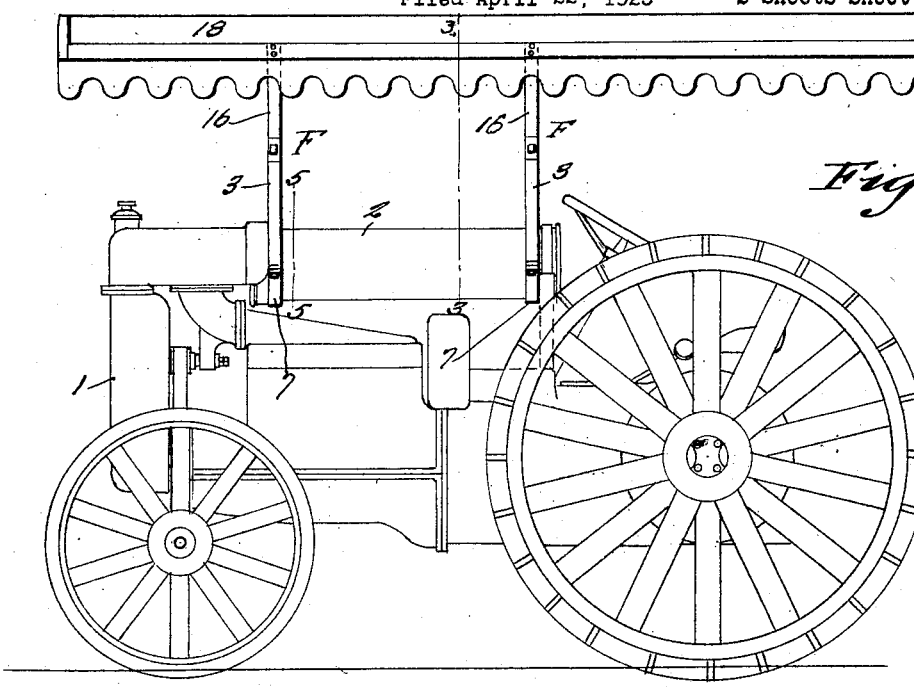
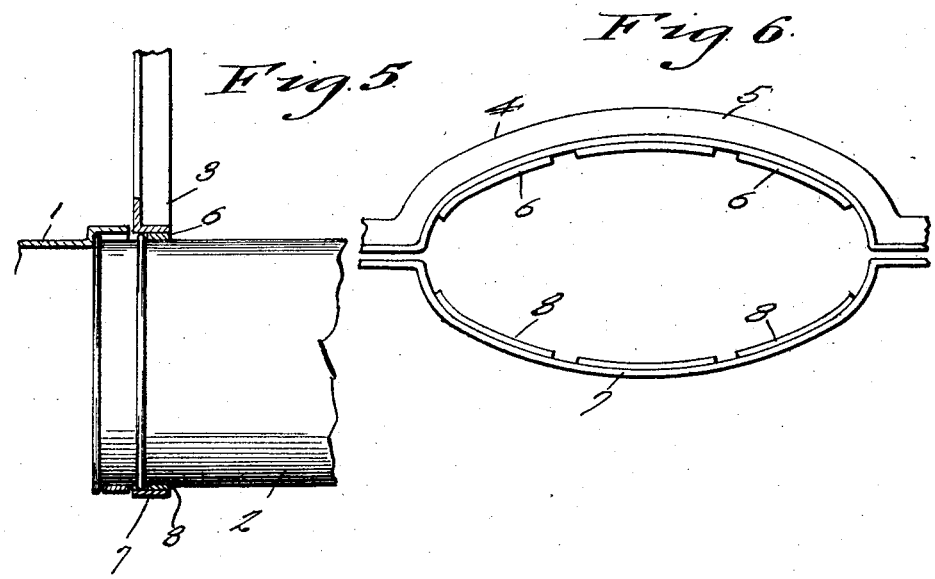
J. B. Logemann
INVENTOR
BY *Victor J. Evans*
ATTORNEY
WITNESS:

Oct. 6, 1925.  
J. B. LOGEMANN  
TRACTOR TOP  
Filed April 22, 1925

J. B. Logemann INVENTOR

BY Victor J. Evans

WITNESS: ATTORNEY

Patented Oct. 6, 1925.

1,556,529

UNITED STATES PATENT OFFICE.

JOHN BARNEY LOGEMANN, OF MELTONVILLE, IOWA.

TRACTOR TOP.

Application filed April 22, 1925. Serial No. 25,056.

*To all whom it may concern:*

Be it known that I, JOHN BARNEY LOGEMANN, a citizen of the United States, residing at Meltonville, in the county of Worth and State of Iowa, have invented new and useful Improvements in Tractor Tops, of which the following is a specification.

The object of this invention is the provision of a top for tractors which will protect the driver as well as the machine from rain, snow and other weather conditions.

A further object is the provision of a top for tractors which is strong and rigid and of a construction whereby the same may be easily and quickly applied on the tractor and bodily removed therefrom.

A further object is the provision of a top for tractors that embodies the desirable features of simplicity and cheapness in construction, accompanied with strength and durability.

With the above broadly stated objects in view and others which will appear as the nature of the invention is better understood, reference is to be had to the drawings which accompany and which form part of this application.

In the drawings:

Figure 1 is a side elevation of a tractor having a top thereon in accordance with this invention.

Figure 5 is a fragmentary transverse sectional view approximately on the line 5—5 of Figure 1.

Figure 6 is a sectional view on the line 6—6 of Figure 5.

Figure 2:
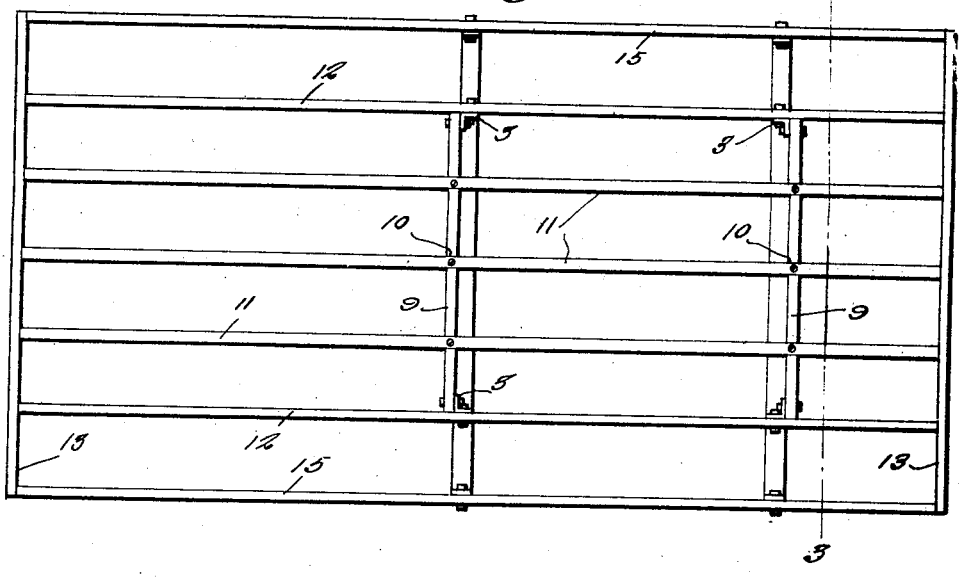
Figure 2 is a top plan view of the frame of the top.
Figure 3:
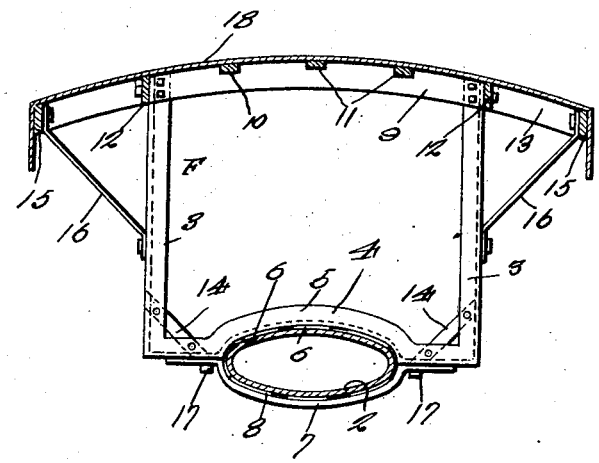
Figure 3 is a transverse sectional view approximately on the line 3—3 of Figure 1.
Figure 4:
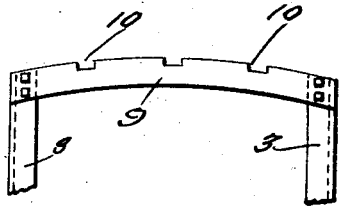
Figure 4 is a fragmentary end view of the upper portion of one of the supporting frames for the top.

In Figure 1 of the drawings I have illustrated my improvement applied on a tractor of the Fordson type, but it is to be understood that I do not wish to restrict the application of my improved top to this particular class of tractors, as the same may be employed with equal efficiency upon other types.

The tractor is indicated by the numeral 1, and the fuel tank thereof by the numeral 2. On the tank 2, adjacent to the ends thereof, I mount the main supporting frames F of my improvement. These frames may and preferably are formed of angle irons and are substantially U-shaped in plan. The parallel and upwardly extending arms of the frames are indicated by the numerals 3 and the lower connecting portion of the said arms is indicated by the numeral 4. The arm 4 is centrally arched, as at 5, and is designed to be arranged over and to conform to the shape of the cross sectional elliptical tank 2. The arched portion 5 of each frame F has its under face provided with strips of compressible material 6, so that the frames will not inflict injury to the tank. The frames F are sustained on the tank through the medium of brackets 7 which have their central portions arched to underlie the tank 2. These arched portions of the brackets are provided with compressible strips 8 to contact directly with the tank. The ends of the brackets 7 are straight and are disposed under the straight ends of the arms 4 of the frames F. These straight ends of the brackets are secured to the arms 4 of the frames F by machine bolts 17. The adjustment of these bolts firmly hold the frame members F on the tank 2.

The arms 3 of the frames F have bolted, riveted or otherwise rigidly secured to their outer ends, arched plates, 9, each of which having its outer edge provided with spaced notches 10. Received and secured in the notches 10 there are slats 11. The slats 11 project a suitable distance beyond the frames F, and have their ends rigidly secured to cross bows 13. The cross bows 13 are shaped to correspond with the arched plates 9 but are of a greater length than the said plates and are extended laterally beyond the sides of the frames F.

Riveted or otherwise rigidly secured to the outer sides at the upper ends of the arms 3 of the frames F and having their ends in a like manner secured to the cross bows 13 there are plates 12. The plates 12 serve to reinforce the frame members F and to hold the same in proper spaced relation on the tank 2. Also to brace the side members 3 with the lower arm or base 4 of the said frames F there are secured to these portions angle braces 14 of strap iron. Rigidly secured to the ends of the cross bows 13 there are outer plates 15. It is to be noted that the plates 12 and 15 are vertically arranged, while the slats 11 are horizontally arranged on the supports therefor. The outer plates 15 are rigidly braced to the side members 3 of the frames F by angle brace members 16. The ends of the members 16 are straight and the said ends are riveted to the inner faces of the plates 15 and the outer sides of the members or arms 3 of the frames F. The skeleton frame provided by the slats 11, the plates 12 and 15 as well as the cross bows 13 and the arched plates 9, is covered by a sheet or canvass or like material 18 which has its ends preferably extended beyond the cross bows 13 and its edges bent over and extended below the plates 15.

While my improvement may remain a fixture on the tractor it will be apparent that by the removal of the machine bolts 17 and the brackets 7 the device, as a unit may be removed from the tractor. The top may be easily and quickly arranged on and effectively secured to the tractor and the simplicity of the construction, the rigidity thereof and its manifold advantages, will, it is thought be perfectly apparent to those skilled in the art to which this invention relates without further detailed description.

Having described the invention, I claim:—

1. The combination with a tractor having a fuel tank, of a top therefor, comprising spaced frames having arched lower portions arranged over the tank, arched brackets on the under face of the tank and removably secured on the frames, the upper portions of the said frames being arched and notched, slats arranged and secured in the notches and projecting beyond the frames and a fabric cover supported by said slats.

2. The combination with a tractor having a fuel tank, of a top therefor, comprising spaced frames having arched lower portions arranged over the tank, arched brackets on the under face of the tank and removably secured on the frames, the upper portions of the said frames being arched and notched, slats arranged and secured in the notches and projecting beyond the frames, cross bows secured to the ends of the slats, inner and outer plates secured to the cross bows, the inner plates being likewise secured to the frames and a fabric cover arranged over said slats and plates.

3. The combination with a tractor having a fuel tank, of a top for said tractor, including substantially U-shaped frames, having their lower members arched to receive therein the upper portion of the tank, oppositely arched brackets on the under faces of the tank removably secured to the frames, compressible means between the arched portions of the frames, the brackets and tank, arched plates secured to the upper ends of the parallel arms of the frames and having spaced notches therein, slats received and secured in the notches and projecting beyond the respective frames, cross bows secured to the ends of the slats, inner plates secured to the cross bows and to the sides of the frame, outer plates secured to the ends of the cross bows, brace means between the outer plates and the frames, brace means between the bottom and side elements of the frames, and a fabric cover for the top.

In testimony whereof I affix my signature.

JOHN BARNEY LOGEMANN.